July 24, 1956 F. UTZ 2,755,830

CUTTER HEAD WITH REINFORCED BIT SEATS

Filed March 13, 1953

INVENTOR:
Friedrich Utz
BY
Richards & Geier
ATTORNEYS

United States Patent Office 2,755,830
Patented July 24, 1956

2,755,830

CUTTER HEAD WITH REINFORCED BIT SEATS

Friedrich Utz, Aistaig (Neckar), Germany

Application March 13, 1953, Serial No. 342,123

2 Claims. (Cl. 144—218)

This invention relates to planing machines and refers more particularly to cutter heads made of light metal so as to diminish weight, for use in portable electrically driven planing machines.

Cutter heads of planing machines which were combined with electrical motors used for driving the machines were found defective in the past in that they could not withstand the stresses occurring in the course of the operation, particularly since bolts used to hold the planing blades exert continuous tension upon adjacent parts, which results in breakage of the cutter head.

An object of the present invention is to eliminate these drawbacks and to provide a planing machine having a cutter head which will be steady and sturdy in construction and will not break despite an extensive amount of use.

Other objects of the present invention will become apparent in the course of the following specification.

In accomplishing the objects of the present invention it was found desirable to strengthen the planing cutter head by means of steel inserts close to the cutter-carrying head portions. Preferably, the steel inserts enclose the cutter-receiving portions, either completely or in part.

According to another feature of the present invention the steel inserts consist of strips of steel sheets provided with two angular portions so that the inserts in section have preferably the same outline on an enlarged scale as that of the cutter-receiving portion. Steel sheets perforated in any suitable manner are used in the course of the casting of the heads so as to provide a good connection between the steel inserts and the light metal of the head.

If the cutter head is to form the housing of an electrical motor with an outer rotor, the steel inserts are so arranged in accordance with the present invention that they are in contact with the laminated rotor. This has the advantage that the heat of the laminated part is transmitted outwardly.

The invention will appear more clearly from the following detailed description when taken in conjunction with the accompanying drawing showing, by way of example, a reinforced planing head having the form of a housing of an outer rotor.

Figure 1:
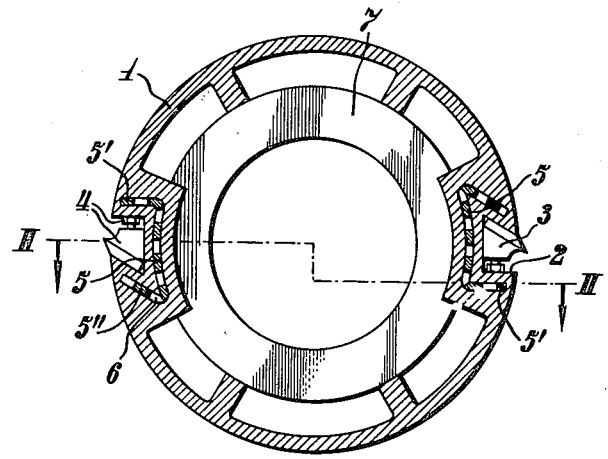
Figure 1 is a transverse section through a cutter head constituting an outer rotor.

The cutter head 1 consists preferably of a light metal and serves as a housing of an electrical motor having an outer rotor. The head 1 is provided with longitudinal grooves, or recesses, 2 adapted to receive the cutters 3 of the planing machine. Any suitable connecting means 4 are used to hold the cutters 3 in the recesses 2. As shown in Figure 1, the recesses 2 have preferably the form of an irregular trapezoid in cross-section.

Figure 2:
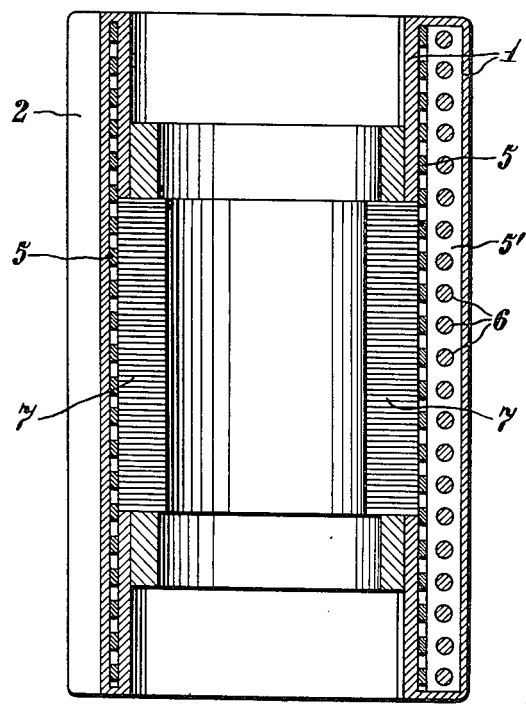
Figure 2 is a longitudinal section along the lines II—II of Figure 1.

In the example illustrated the cutter head 1 is reinforced by strips 5 consisting of steel sheets and embedded in the material of the head. Preferably perforated steel sheets are used for the manufacture of the strips so that in the course of the casting of the liquid metal, during manufacturing of the head, the metal penetrates through the perforations as shown at 6 in Figure 2 and provides a thorough connection at both sides of the steel inserts.

In the example illustrated the steel sheet inserts 5 are provided with two bent edges 5' and 5". The inserts 5 are bent, or turned, in such manner that a single steel insert encompasses the cutter-receiving recess 2 on three sides. In other words, the cross section of the steel insert 5 constitutes an enlargement of the cross section of a recess 2.

It is apparent that a steel insert 5 having the angular portions 5' and 5" may consist of two or more separate pieces. The drawing illustrates a housing for the outer rotor which contains a laminated body 7 constituting the short-circuited rotor of the electrical motor used for driving the machine. This laminated body is manufactured in the usual manner by pressing and casting operations. In accordance with the present invention it firmly engages the steel inserts 5 so that the heat developed in the rotor 7 as a result of friction, windage, and hysteresis effects is effectively conducted outwardly. In practice the laminated rotor and the perforate steel insert are held in the mould in which the hollow head 1 is cast. Upon cooling of the casting, the shrinkage results in firm engagement between shaft 1, rotor 7, and insert 5, so as to cause said elements to move as a unit.

Since the subject of the present invention is not concerned with other parts of the planing machine or of the electrical motor they are not illustrated or described here.

It is apparent that the described construction provides an excellent reinforcement for the planing cutter head as a result of which the life of the head is increased to a considerable extent.

It is further apparent that the example shown above has been given solely by way of illustration and not by way of limitation and may be subject to different variations and modifications without exceeding the scope of the present invention. All such variations and modifications are to be included within the scope of the present invention.

What is claimed is:

1. In planing machines, a cutter-carrying head comprising a body having cutter-receiving recesses formed therein and steel inserts embedded within said head and partially surrounding said recesses.

2. In planing machines, a cutter-carrying head comprising a body having cutter-receiving recesses formed therein and steel inserts embedded within said head around said recesses and each having two angular portions, the cross-sectional area encompassed by each insert being similar to and larger than the area of said recess, whereby the head is provided with additional strength particularly at the cutter recesses.

References Cited in the file of this patent

UNITED STATES PATENTS

| | | |
|---|---|---|
| 940,940 | Porter | Nov. 23, 1909 |
| 1,333,727 | Phillippi | Mar. 16, 1920 |
| 2,288,291 | Martin | June 30, 1942 |
| 2,325,617 | Lysholm et al. | Aug. 3, 1943 |

FOREIGN PATENTS

| | | |
|---|---|---|
| 823,516 | Germany | Dec. 3, 1951 |